United States Patent
Geng et al.

(10) Patent No.: US 10,838,691 B2
(45) Date of Patent: Nov. 17, 2020

(54) METHOD AND APPARATUS OF AUDIO/VIDEO SWITCHING

(71) Applicant: Shanghai Bilibili Technology Co., Ltd., Shanghai (CN)

(72) Inventors: Zhou Geng, Shanghai (CN); Yiyun Gu, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 16/773,788

(22) Filed: Jan. 27, 2020

(65) Prior Publication Data
US 2020/0241835 A1  Jul. 30, 2020

(30) Foreign Application Priority Data
Jan. 30, 2019  (CN) .......................... 2019 1 0092650

(51) Int. Cl.
  *G06F 3/16*   (2006.01)
  *H04N 21/2387*  (2011.01)
  *H04N 5/765*   (2006.01)

(52) U.S. Cl.
  CPC ............. *G06F 3/165* (2013.01); *H04N 5/765* (2013.01); *H04N 21/2387* (2013.01)

(58) Field of Classification Search
  CPC ..... H04N 5/765; H04N 21/2387; G06F 3/165
  See application file for complete search history.

(56) References Cited

U.S. PATENT DOCUMENTS

| | | | |
|---|---|---|---|
| 2014/0130073 A1* | 5/2014 | Yu | H04N 21/44222 725/14 |
| 2017/0041355 A1* | 2/2017 | Ramamurthy | H04L 67/02 |
| 2017/0041680 A1* | 2/2017 | Lewis | H04N 21/4852 |
| 2017/0126774 A1* | 5/2017 | Woodman | G06F 1/3206 |
| 2017/0339207 A1* | 11/2017 | Mueller | H04L 65/4084 |
| 2017/0347136 A1* | 11/2017 | Frantz | H04N 21/44004 |

* cited by examiner

*Primary Examiner* — Fan S Tsang
*Assistant Examiner* — David Siegel
(74) *Attorney, Agent, or Firm* — BakerHostetler

(57) ABSTRACT

Techniques for switching between different playback modes are described herein. The disclosed techniques include detecting a state of playing a content item using Dynamic Adaptive Streaming over HTTP (DASH); determining whether there is a need of switching between a first playback mode and a second playback mode based on the detected state of playing the content item; determining a segment number of a segment among the plurality of segments currently being played based on a timestamp of the segment in response to determining that there is the need of switching between the first playback mode and the second playback mode; obtaining content of the content item based at least in part on the segment number and a playback mode to be switched to; and playing the content item in a switched playback mode.

16 Claims, 8 Drawing Sheets

METHOD AND APPARATUS OF AUDIO/VIDEO SWITCHING

CROSS-REFERENCE TO RELATED APPLICATION

The present application claims priority of Chinese patent application No. 201910092650.6, filed on Jan. 30, 2019. The entire disclosure of the above-identified application is hereby incorporated by reference herein and made a part of this specification.

BACKGROUND

With the development of the Internet and smart terminals, more and more users play streaming media (e.g., audios and videos) using kinds of smart terminals, such as mobile phones and computers. Users can obtain streaming media content from network servers through the smart terminals, and render the streaming media content through the smart terminals.

BRIEF DESCRIPTION OF THE DRAWINGS

The following detailed description may be better understood when read in conjunction with the appended drawings. For purposes of illustration, there are shown in the drawings exemplary embodiments of various aspects of the disclosure; however, the disclosure is not limited to the specific methods and instrumentalities disclosed.

DETAILED DESCRIPTION OF ILLUSTRATIVE EMBODIMENTS

Figure 1:
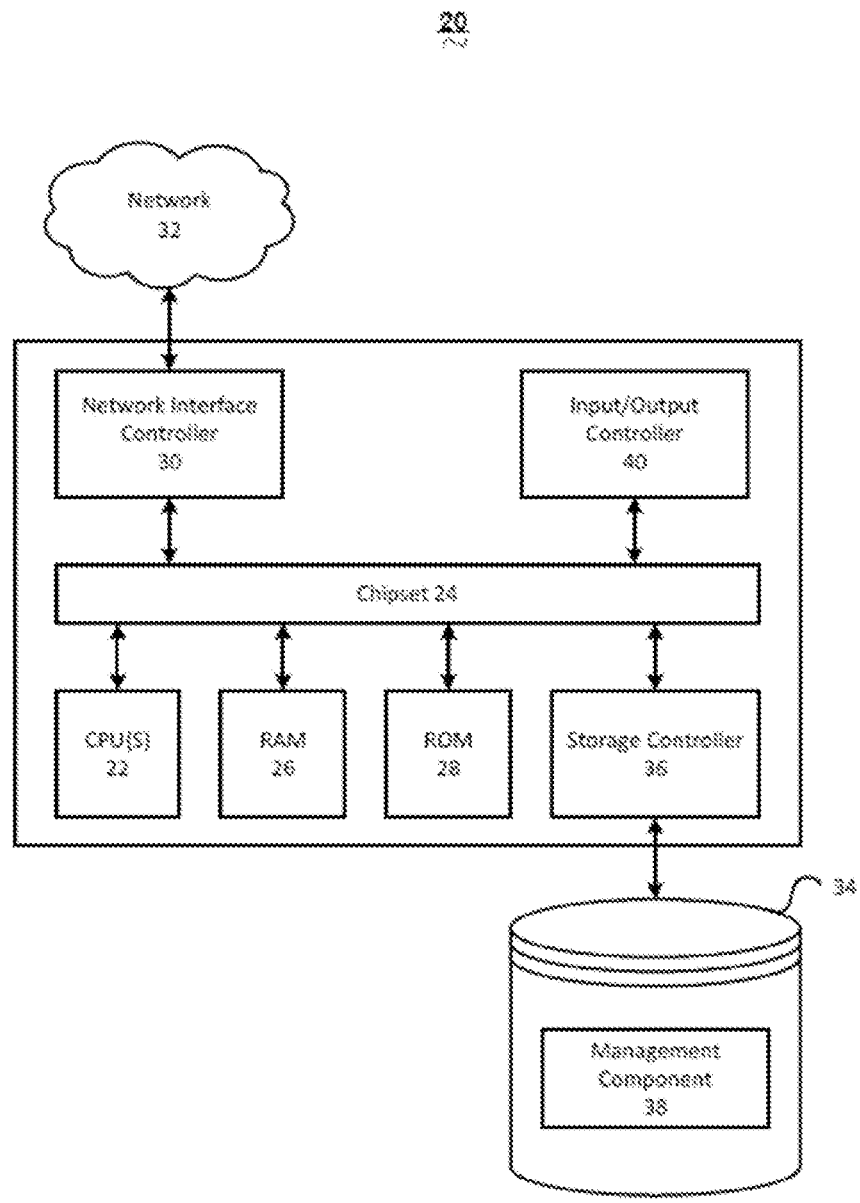
FIG. 1 is a schematic diagram illustrating an example computing device that may be used in accordance with the present disclosure.

FIG. 1 depicts a computing device that may be used in various aspects, such as services, networks, and/or clients. The computer architecture shown in FIG. 1 shows a conventional server computer, workstation, desktop computer, laptop, tablet, network appliance, PDA, e-reader, digital cellular phone, or other computing nodes, and may be utilized to execute any aspects of the computers described herein, such as to implement the methods described herein.

A computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through a local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other types of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 1, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 1, may also include an input/output controller 40 for receiving and processing input from a number of input devices, such as a keyboard, a mouse, a touchpad, a touch screen, an electronic stylus, or another type of input device. Similarly, an input/output controller 40 may provide output to a display, such as a computer monitor, a flat-panel display, a digital projector, a printer, a plotter, or another type of output device. It will be appreciated that the computing device 20 may not include all of the components shown in FIG. 1, may include other components that are not explicitly shown in FIG. 1, or may utilize an architecture completely different than that shown in FIG. 1.

As described herein, a computing device may be a physical computing device, such as the computing device 20 of FIG. 1. A computing node may also include a virtual machine host process and one or more virtual machine instances. Computer-executable instructions may be executed by the physical hardware of a computing device indirectly through interpretation and/or execution of instructions stored and executed in the context of a virtual machine.

Embodiment 1

Figure 2:
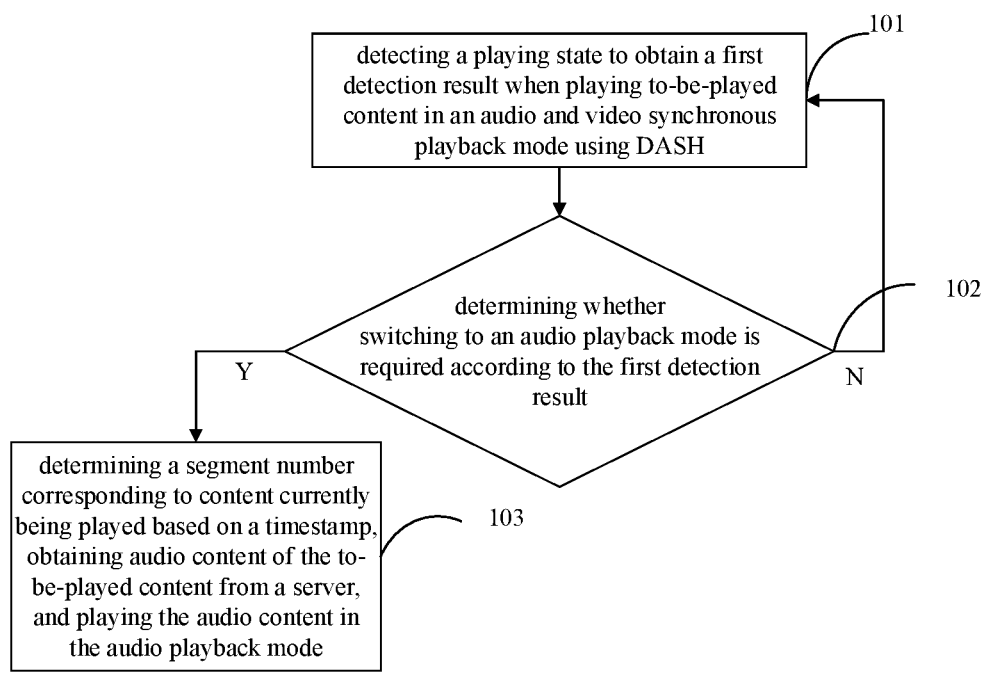
FIG. 2 is a flowchart illustrating an example method for audio/video switching in accordance with the present disclosure.

Referring to FIG. 2, which is a flowchart illustrating an example method of audio/video switching in accordance with the present disclosure. In an embodiment, the method may be applied in a client. The method may include blocks 101~103.

At block 101, detecting a playing state to obtain a first detection result when playing to-be-played content in an audio and video synchronous playback mode using DASH.

Wherein, DASH (Dynamic Adaptive Streaming over HTTP) is an adaptive bitrate streaming technology, which enables high-quality streaming media to be delivered on the Internet through traditional HTTP network servers.

In the embodiment, a playback mode includes an audio and video synchronous playback mode, an audio and video pause mode and an audio playback mode. In the audio and video synchronous playback mode, users can see video content and hear audio content. In the audio and video pause mode, users neither see video content nor hear audio content. In the audio playback mode, users can hear audio content but not see video content.

At block 102, determining whether switching to the audio playback mode is required according to the first detection result. If yes, the method goes to block 103; if no, the method goes to the block 101.

Figure 3:
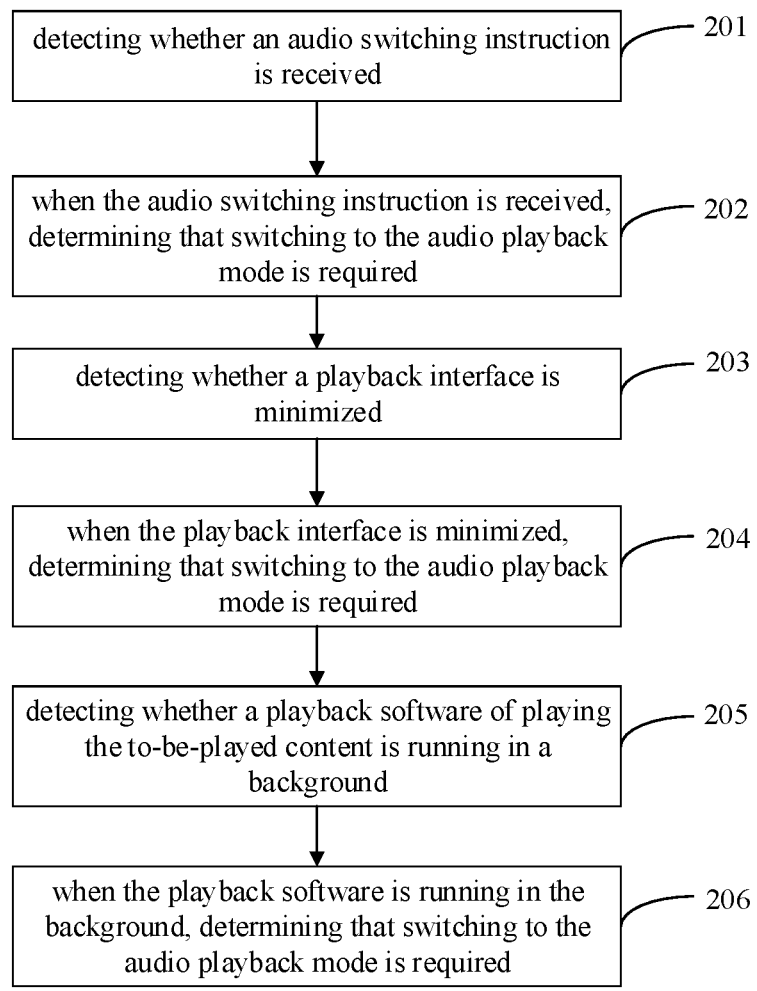
FIG. 3 is a flowchart illustrating another example method of audio/video switching in accordance with the present disclosure.

In one exemplary embodiment, as illustrated in FIG. 3, the method may further include blocks 201~206.

At block 201, detecting whether an audio switching instruction is received.

At block 202, when the audio switching instruction is received, determining that switching to the audio playback mode is required.

At block 203, detecting whether a playback interface is minimized.

At block 204, when the playback interface is minimized, determining that switching to the audio playback mode is required.

At block 205, detecting whether a playback software of playing the to-be-played content is running in a background.

At block 206, when the playback software is running in the background, determining that switching to the audio playback mode is required.

The audio switching instruction may be triggered by a user. For example, the user can trigger the audio switching instruction by clicking a preset audio play button. When the audio switching instruction triggered by the user on a web (for example, PC) or a mobile (for example, smart phone) is received, the playback mode is automatically switched to the audio playback mode.

The playback interface is a display interface for playing streaming media content on a web. When the playback interface is minimized by the user, the playback mode is automatically switched to the audio playback mode. During a process of playing the audio content and the video content synchronously, when the playback interface is minimized by the user and the playback mode is not switched to the audio and video pause mode, the playback mode is automatically switched to the audio playback mode to save data traffic and power consumption because the user has a demand for listening to the audio content and has not a demand for watching the video content.

The playback software is an application software for playing the streaming media content on a mobile terminal. When the playback software is switched by the user to running in the background, the playback mode is automatically switched to the audio playback mode.

In the embodiment, when the streaming media content is played through the application software on the mobile terminal, whether the playback mode is switched to the audio playback mode is determined depends on whether an audio switching instruction triggered by a user is received or depends on whether the playback software is switched from running in the foreground to running in the background. When the streaming media content is played through a web page on the web, whether the playback mode is switched to the audio playback mode is determined depends on whether an audio switching instruction triggered by the user is received, or depends on whether the playback interface is minimized by the user. The embodiment provides a variety of determination methods for switching to the audio playback mode, which simplifies user operations and improves user experience.

At block 103, determining a segment number corresponding to content currently being played based on a timestamp of the content, obtaining audio content of the to-be-played content from a server, and playing the audio content in the audio playback mode.

In traditional audio and video playback technologies, audio content and video content are located in a streaming media file. The client can obtain the streaming media file from the server, and then parses the streaming media file to obtain the audio content and the video content, and plays the audio content and the video content. In DASH technologies, the server compresses and encapsulates the video content of the streaming media content to form a video data file, and compresses and encapsulates the audio content of the streaming media content to form an audio data file. The client needs to obtain the video data file and the audio data file from the server separately, and performs the audio and video playing by parsing the video data file and the audio data file.

In the embodiment, the server stores video data files formed according to the video content of the to-be-played content and audio data files formed according to the audio content of the to-be-played content. When performing audio playing is required, the client transmits a request for obtaining the audio data file to the server and not transmits any request for obtaining the video data file based on a separation characteristic between the audio content and the video content in DASH.

In one exemplary embodiment, the block 103 may include blocks A1~A4.

At block A1, determining a segment number corresponding to content currently being played based on a timestamp of the content, continuing obtaining the audio content corresponding to the segment number from an audio buffer area and stopping obtaining the video content from a video buffer area, and performing the audio playback mode on a current media segment according to the audio content.

In DASH technologies, the streaming media content may be divided into a plurality of media segments, each media segment corresponds to a preset time length of content (for example, 10 seconds). Each media segment includes an audio data file and a video data file. Before playing one media segment, the client obtains an audio data file and a video data file separately corresponding to the media segment from the server, then caches audio content obtained through parsing the audio data file in the audio buffer area, and caches video content obtained through parsing the video data file in the video buffer area.

In the embodiment, when switching to the audio playback mode is required during a process of playing one media segment of the to-be-played content, the client may disconnect a link of a video stream and maintain a link of an audio stream to continue playing the audio content.

At block A2, transmitting the server with a request for obtaining an audio data file of a next media segment.

Staring from the next media segment, the client transmits the server with requests for obtaining the audio data file of the to-be-played content and does not transmit the server with any request for obtaining the video data file of the to-be-played content.

At block A3, receiving the audio data file of the to-be-played content from the server, and parsing the audio data file to obtain the audio content.

Wherein, the parsing the audio data file to obtain the audio content may further include:

performing a decapsulation operation on the audio data file to obtain audio stream compression encoded data, and performing a decoding operation on the audio compression encoded data to obtain the audio content.

Decapsulation is also known as demultiplexing. Decapsulation is used to separate a file with an encapsulation format (for example, AVI format, PM4 format, FLU format) into audio stream compression encoded data or video stream compression encoded data. Decoding is a process of recovering compression data into an audio signal and a video signal performed by a decoder.

At block A4, performing the audio playback mode on the next media segment according to the audio content.

In the embodiment, when the audio playback mode is required, the client plays the current media segment of a buffered audio content in the audio playback mode and obtains only audio data files starting from the next media segment until the playback mode is switched to the audio and video synchronous playback mode or the playback mode is switched to the audio and video pause mode.

Figure 4:
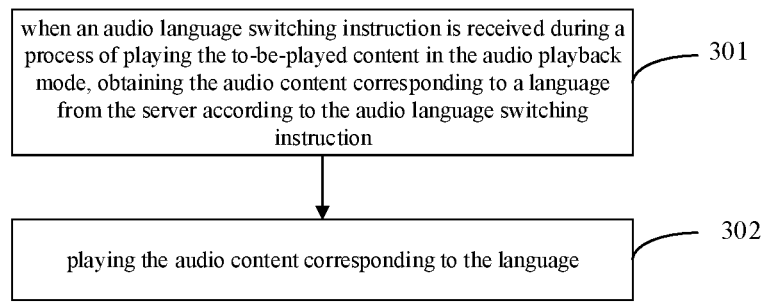
FIG. 4 is a flowchart illustrating another example method of audio/video switching in accordance with the present disclosure.

In one exemplary embodiment, as illustrated in FIG. 4, the method may further include block 301 and block 302.

At block 301, when an audio language switching instruction is received during a process of playing the to-be-played content in the audio playback mode, obtaining the audio content corresponding to a language from the server according to the audio language switching instruction.

At block 302, playing the audio content corresponding to the language.

For example, the to-be-played content is an American movie with two languages, for example, English and Chinese. During the process of playing the to-be-played content in the audio playback mode, English or Chinese can be chosen according to the user's selection.

Figure 5:
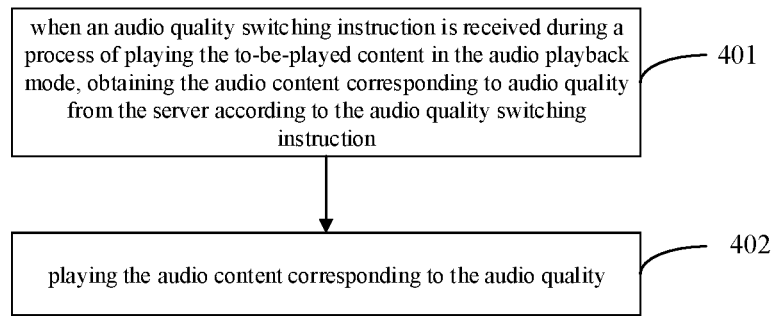
FIG. 5 is a flowchart illustrating another example method of audio/video switching in accordance with the present disclosure.

In one exemplary embodiment, as illustrated in FIG. 5, the method may further include block 401 and block 402.

At block 401, when an audio quality switching instruction is received during a process of playing the to-be-played content in the audio playback mode, obtaining the audio content corresponding to audio quality from the server according to the audio quality switching instruction.

At block 402, playing the audio content corresponding to the audio quality.

For example, the audio content of the to-be-played content has three audio quality to be chosen from, for example, standard audio quality, high audio quality, and lossless audio quality. The audio content corresponding to be audio quality can be chosen according to the user's selection during the process of playing the to-be-played content in the audio playback mode.

Figure 6:
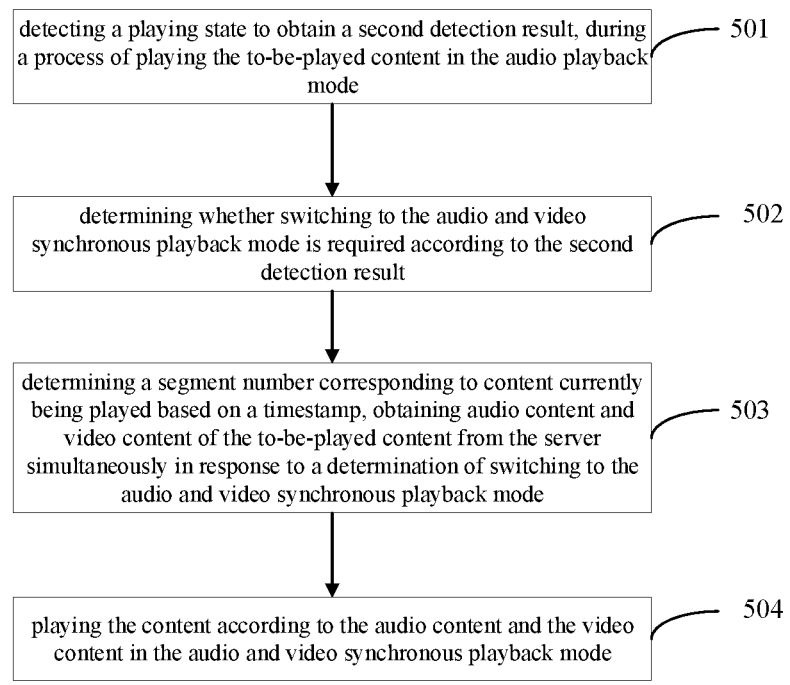
FIG. 6 is a flowchart illustrating another example method of audio/video switching in accordance with the present disclosure.

In one exemplary embodiment, please refer to FIG. 6, which is a flowchart illustrating another example method for audio/video switching in accordance with the present disclosure. The method may include blocks 501~504.

At block 501, detecting a playing state to obtain a second detection result, during a process of playing the to-be-played content in the audio playback mode.

At block 502, determining whether switching to the audio and video synchronous playback mode is required according to the second detection result.

Figure 7:
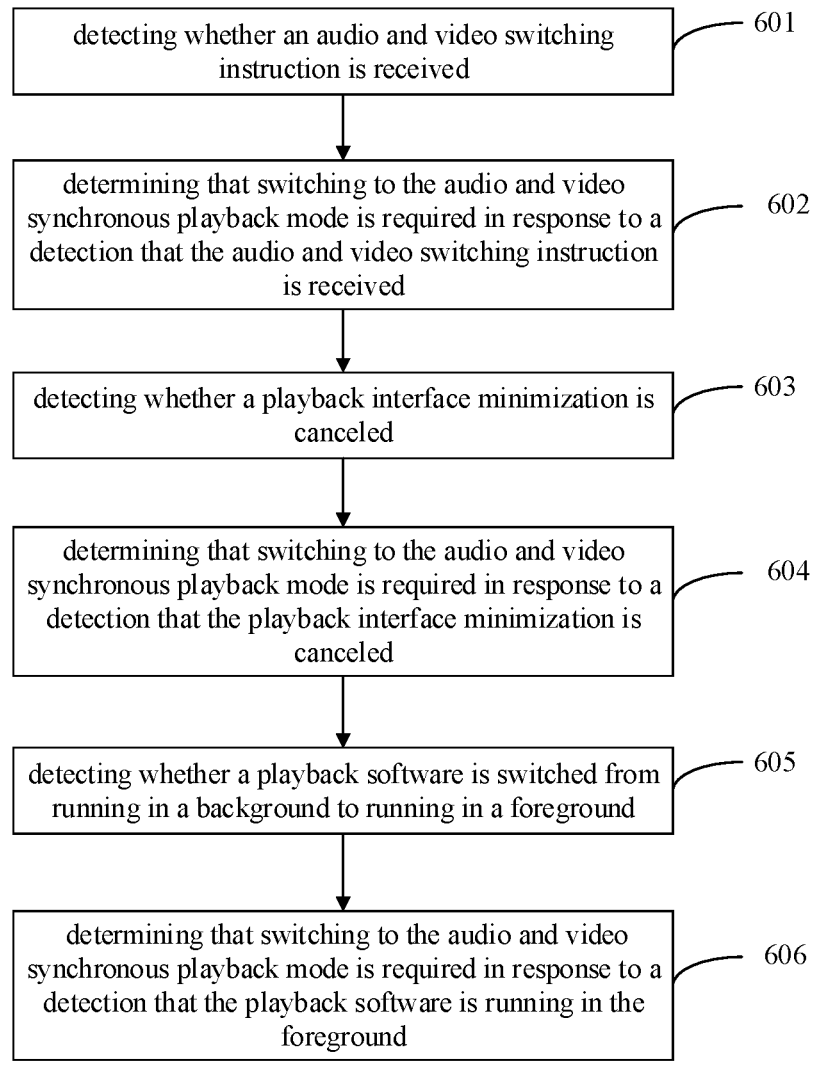
FIG. 7 is a flowchart illustrating another example method of audio/video switching in accordance with the present disclosure.

In one exemplary embodiment, as illustrated in FIG. 7, the method may further include blocks 601~606.

At block 601, detecting whether an audio and video switching instruction is received.

At block 602, determining that switching to the audio and video synchronous playback mode is required in response to a detection that the audio and video switching instruction is received.

At block 603, detecting whether a playback interface minimization is canceled.

At block 604, determining that switching to the audio and video synchronous playback mode is required in response to a detection that the playback interface minimization is canceled.

At block 605, detecting whether a playback software is switched from running in a background to running in a foreground.

At block 606, determining that switching to the audio and video synchronous playback mode is required in response to a detection that the playback software is running in the foreground.

The audio and video switching instruction may be triggered by a user. For example, the user can trigger the audio and video switching instruction by clicking a preset play button. When the audio and video switching instruction triggered by the user on a web (for example, PC) or a mobile terminal (for example, smartphone) is received, the playback mode is switched to the audio and video synchronous playback mode automatically.

The playback interface is a display interface for playing streaming media content on a web. When the playback interface minimization is canceled by the user, the playback mode is automatically switched to the audio content and video content synchronous playback mode. The playback software is an application software to play the streaming media content on the mobile terminal. When the playback software is switched to running in the foreground by the user, the playback mode is switched to the audio and video synchronous playback mode automatically.

In the embodiment, when playing the streaming media content through the application software on the mobile terminal, the client determines whether the playback mode is switched to the audio and video synchronous playback mode depends on whether an audio and video switching instruction triggered by a user is received or depends on whether the playback software is switched from running in the background to running in the foreground. When playing the streaming media content through a web page on the web, the client determines whether the playback mode is switched to the audio and video synchronous playback mode depends on whether an audio and video switching instruction triggered by the user is received or depends on whether the playback interface minimization is canceled by the user.

At block 503, determining a segment number corresponding to audio content currently being played based on a timestamp of the audio content, obtaining audio content and video content of the to-be-played content from the server simultaneously in response to a determination of switching to the audio and video synchronous playback mode.

In one exemplary embodiment, the block 503 may further include blocks B1~B3.

At block B1, obtaining a timestamp of audio content of the current media segment, and determining a segment number of the audio content according to the timestamp;

At block B2, sending a request to the server to obtain an audio data file corresponding to the segment number and a video data file corresponding to the segment number;

At block B3, receiving the audio data file and the video data file from the server, parsing the audio data file to obtain the audio content, and parsing the video data file to obtain the video content.

In the embodiment, the to-be-played content is divided into multiple media segments, each media segment corresponds to a segment number. Each segment number corresponds to an audio data file and a video data file.

In one exemplary embodiment, the block B3 may include block C1 and C2.

At block C1, performing a decapsulation operation on the audio data file to obtain audio stream compression encoded data, and performing a decoding operation on the audio compression encoded data to obtain the audio content.

At block C2, performing a decapsulation operation on the video data file to obtain video stream compression encoded data, and performing a decoding operation on the video compression encoded data to obtain the video content.

At block 504, playing the content according to the audio content and the video content in the audio and video synchronous playback mode.

In the embodiment, during the process of playing the to-be-played content in the audio playback mode, whether the audio playback mode switches to the audio and video synchronous playback mode, depends on a user instruction or a user operation is received. When it is necessary to switch the audio playback mode to the audio and video synchronous playback mode, according to the audio content, the video content and audio content of the current media segment are reacquired from the server to replay the current media segment in the audio and video synchronization playback mode.

Embodiment 2

Figure 8:
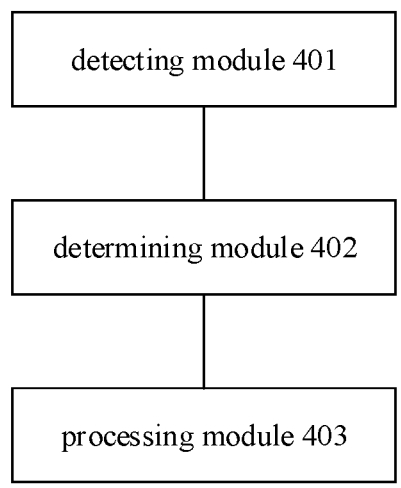
FIG. 8 is a block diagram of program modules of an apparatus for audio/video switching in accordance with the present disclosure.

FIG. 8 is a block diagram of program modules of an apparatus for audio/video switching in accordance with the present disclosure. The apparatus may be partitioned into one or more program modules which are stored in a storage medium and executed by one or more processors to complete the embodiments of the present application. The program module in the embodiment of the present application refers to a series of computer program instruction segments capable of performing specific functions and is more suitable for describing execution process of the data writing system in the storage medium than the program itself. The following specifically describes functions of the program modules in the embodiment.

As shown in FIG. 8, the apparatus applied in a client may include a detecting module 401, a determining module 402 and a processing module 403, wherein:

The detecting module 401 is configured to detect a playing state to obtain a first detection result when playing to-be-played content in an audio and video synchronous playback mode using DASH.

The determining module 402 is configured to determine whether switching to an audio playback mode is required according to the first detection result.

In one exemplary embodiment, the detecting module 401 is further configured to detect whether an audio switching instruction is received. The determining module 402 is configured to determine that switching to the audio playback mode is required, in response to a detection that the audio switching instruction is received.

In one exemplary embodiment, the detecting module 401 is further configured to detect whether a playback interface is minimized. The determining module 402 is configured to determine that switching to the audio playback mode is required, in response to a detection that the playback interface is minimized.

In one exemplary embodiment, the detecting module 401 is further configured to detect whether a playback software of playing the to-be-played content is switched to running in a background. The determining module 402 is configured to determine that switching to the audio playback mode is required, in response to a detection that the playback software is switched to running in the background.

The processing module 403 is configured to obtain audio content of the to-be-played content in response to a determination of switching to the audio playback mode and play the audio content in the audio playback mode.

In one exemplary embodiment, the apparatus may further include a first switching module and a second switching module.

The first switching module is configured to obtain the audio content corresponding to a language in response to an audio language switching instruction during a process of playing the to-be-played content in the audio playback mode and play the audio content corresponding to the language.

The second switching module is configured to obtain the audio content corresponding to audio quality in response to the audio quality switching instruction during a process of playing the to-be-played content in the audio playback mode and play the audio content corresponding to the audio quality.

In one exemplary embodiment, during a process of playing the to-be-played content in the audio playback mode, the detecting module 401 is further configured to detect a playing state to obtain a second detection result. The determining module 402 is configured to determine to switch to the audio and video synchronous playback mode is required according to the second detection result.

In one exemplary embodiment, during a process of playing the to-be-played content in the audio playback mode, the detecting module 401 is further configured to detect whether an audio and video switching instruction is received. The determining module 402 is configured to determine that switching to the audio and video synchronous playback mode is required in response to a detection that the audio and video switching instruction is received.

In one exemplary embodiment, during a process of playing the to-be-played content in the audio playback mode, the detecting module 401 is further configured to detect whether a playback interface minimization is canceled. The determining module 402 is configured to determine that switching to the audio and video synchronous playback mode is required, in response to a detection that the playback interface minimization is canceled.

In one exemplary embodiment, during a process of playing the to-be-played content in the audio playback mode, the detecting module 401 is further configured to detect whether a playback software of playing the to-be-played content is switched from running in a background to running in a foreground. The determining module 402 is configured to determine that switching to the audio and video synchronous playback mode is required, in response to a detection that the playback software is switched from running in the background to running in the foreground.

In one exemplary embodiment, during a process of playing the to-be-played content in the audio playback mode, the processing module 403 is configured to obtain the audio content of the to-be-played content and video content of the to-be-played content simultaneously in response to a determination of switching to the audio and video synchronous playback mode and play the audio content and the video content in the audio and video synchronous playback mode.

What is claimed is:

1. A computer-implemented method of switching between different playback modes, comprising:
   detecting a state of playing a content item using Dynamic Adaptive Streaming over HTTP (DASH), the content item comprising a plurality of segments;
   determining whether there is a need of switching between a first playback mode and a second playback mode based on the detected state of playing the content item, the first playback mode being a mode of synchronously playing video and audio of the content item, and a second playback mode being a mode of playing the audio of the content item only;
   determining a segment number based on a timestamp of content currently being played and corresponding to a segment among the plurality of segments in response to determining that there is the need of switching between the first playback mode and the second playback mode;
   obtaining content of the content item based at least in part on the segment number and a playback mode to be switched to;
   playing the content item in a switched playback mode;
   wherein the determining whether there is a need of switching between a first playback mode and a second playback mode based on the detected state of playing the content item further comprises:
   determining to switch from the first playback mode to the second playback mode in response to detecting that a playback interface of playing the content item is minimized, detecting that a playback software of playing the content item is running in a background, or detecting that an instruction of switching from the first playback mode to the second playback mode is received;

wherein the computer-implemented method further comprises:

obtaining content of an audio segment corresponding to the segment number from a local buffer area; and sending a server requests for subsequent audio segments only until switching to the first playback mode or a pause mode.

2. The computer-implemented method of claim 1, wherein the detecting a state of playing a content item further comprises at least one of:

detecting whether a playback interface of playing the content item is minimized;

detecting whether a playback software of playing the content item is running in a background or a foreground; and detecting whether an instruction of switching between a first playback mode and a second playback mode is received.

3. The computer-implemented method of claim 1, further comprising:

receiving the subsequent audio segments from the server;

performing decapsulation operations and decoding operations on the subsequent audio segments; and playing the content item in the second playback mode.

4. The computer-implemented method of claim 3, further comprising:

obtaining audio segments corresponding to a language in response to receiving an instruction of specifying the language; and playing the content item in the language.

5. The computer-implemented method of claim 3, further comprising:

obtaining audio segments corresponding to an audio quality in response to receiving an instruction of specifying the audio quality; and playing the content item with the audio quality.

6. The computer-implemented method of claim 1, wherein the determining whether there is a need of switching between a first playback mode and a second playback mode based on the detected state of playing the content item further comprises:

determining to switch from the second playback mode to the first playback mode in response to detecting that a minimization of a playback interface of playing the content item is cancelled, detecting that a playback software of playing the content item is running in a foreground, or detecting that an instruction of switching from the second playback mode to the first playback mode is received.

7. The computer-implemented method of claim 6, further comprising:

sending a request for a video segment and an audio segment corresponding to the segment number and subsequent requests for subsequent video segments and audio segments until switching to the second playback mode or a pause mode; and receiving the video segment and the audio segment corresponding to the segment number and the subsequent video segments and audio segments.

8. The computer-implemented method of claim 7, further comprising:

performing decapsulation operations and decoding operations on the received video segments and audio segments; and playing the content item in the first playback mode.

9. A computing device of switching between different playback modes, comprising:

at least one processor; and at least one memory communicatively coupled to the at least one processor and storing instructions that upon execution by the at least one processor cause the computing device to:

detect a state of playing a content item using Dynamic Adaptive Streaming over HTTP (DASH), the content item comprising a plurality of segments;

determine whether there is a need of switching between a first playback mode and a second playback mode based on the detected state of playing the content item, the first playback mode being a mode of synchronously playing video and audio of the content item, and a second playback mode being a mode of playing the audio of the content item only;

determine a segment number based on a timestamp of content currently being played and corresponding to a segment among the plurality of segments in response to determining that there is the need of switching between the first playback mode and the second playback mode;

obtain content of the content item based at least in part on the segment number and a playback mode to be switched to;

play the content item in a switched playback mode;

wherein the at least one memory further stores instructions that upon execution by the at least one processor cause the computing device to:

determine to switch from the first playback mode to the second playback mode in response to detecting that a playback interface of playing the content item is minimized, detecting that a playback software of playing the content item is running in a background, or detecting that an instruction of switching from the first playback mode to the second playback mode is received;

obtain content of an audio segment corresponding to the segment number from a local buffer area; and send a server requests for subsequent audio segments only until switching to the first playback mode or a pause mode.

10. The computing device of claim 9, the at least one memory further stores instructions that upon execution by the at least one processor cause the computing device to:

receive the subsequent audio segments from the server;

perform decapsulation operations and decoding operations on the subsequent audio segments; and play the content item in the second playback mode.

11. The computing device of claim 10, the at least one memory further stores instructions that upon execution by the at least one processor cause the computing device to:

obtain audio segments corresponding to a language in response to receiving an instruction of specifying the language; and play the content item in the language.

12. The computing device of claim 10, the at least one memory further stores instructions that upon execution by the at least one processor cause the computing device to:

obtain audio segments corresponding to an audio quality in response to receiving an instruction of specifying the audio quality; and play the content item with the audio quality.

13. The computing device of claim 9, the at least one memory further stores instructions that upon execution by the at least one processor cause the computing device to:

determine to switch from the second playback mode to the first playback mode in response to detecting that a minimization of a playback interface of playing the content item is cancelled, detecting that a playback software of playing the content item is running in a foreground, or detecting that an instruction of switching from the second playback mode to the first playback mode is received.

14. The computing device of claim 13, the at least one memory further stores instructions that upon execution by the at least one processor cause the computing device to:

send a request for a video segment and an audio segment corresponding to the segment number and subsequent requests for subsequent video segments and audio segments until switching to the second playback mode or a pause mode; and receive the video segment and the audio segment corresponding to the segment number and the subsequent video segments and audio segments.

15. A non-transitory computer-readable storage medium, storing computer-readable instructions that upon execution by a processor cause the processor to perform operations, the operations comprising:

detecting a state of playing a content item using Dynamic Adaptive Streaming over HTTP (DASH), the content item comprising a plurality of segments;

determining whether there is a need of switching between a first playback mode and a second playback mode based on the detected state of playing the content item, the first playback mode being a mode of synchronously playing video and audio of the content item, and a second playback mode being a mode of playing the audio of the content item only;

determining a segment number based on a timestamp of content currently being played and corresponding to a segment among the plurality of segments in response to determining that there is the need of switching between the first playback mode and the second playback mode;

obtaining content of the content item based at least in part on the segment number and a playback mode to be switched to;

playing the content item in a switched playback mode;

wherein the operations further comprise:

determining to switch from the first playback mode to the second playback mode in response to detecting that a playback interface of playing the content item is minimized, detecting that a playback software of playing the content item is running in a background, or detecting that an instruction of switching from the first playback mode to the second playback mode is received;

obtaining content of an audio segment corresponding to the segment number from a local buffer area; and sending a server requests for subsequent audio segments only until switching to the first playback mode or a pause mode.

16. The non-transitory computer-readable storage medium of claim 15, wherein the detecting a state of playing a content item further comprises at least one of:

detecting whether a playback interface of playing the content item is minimized;

detecting whether a playback software of playing the content item is running in a background or a foreground; and detecting whether an instruction of switching between a first playback mode and a second playback mode is received.

\* \* \* \* \*